UNITED STATES PATENT OFFICE.

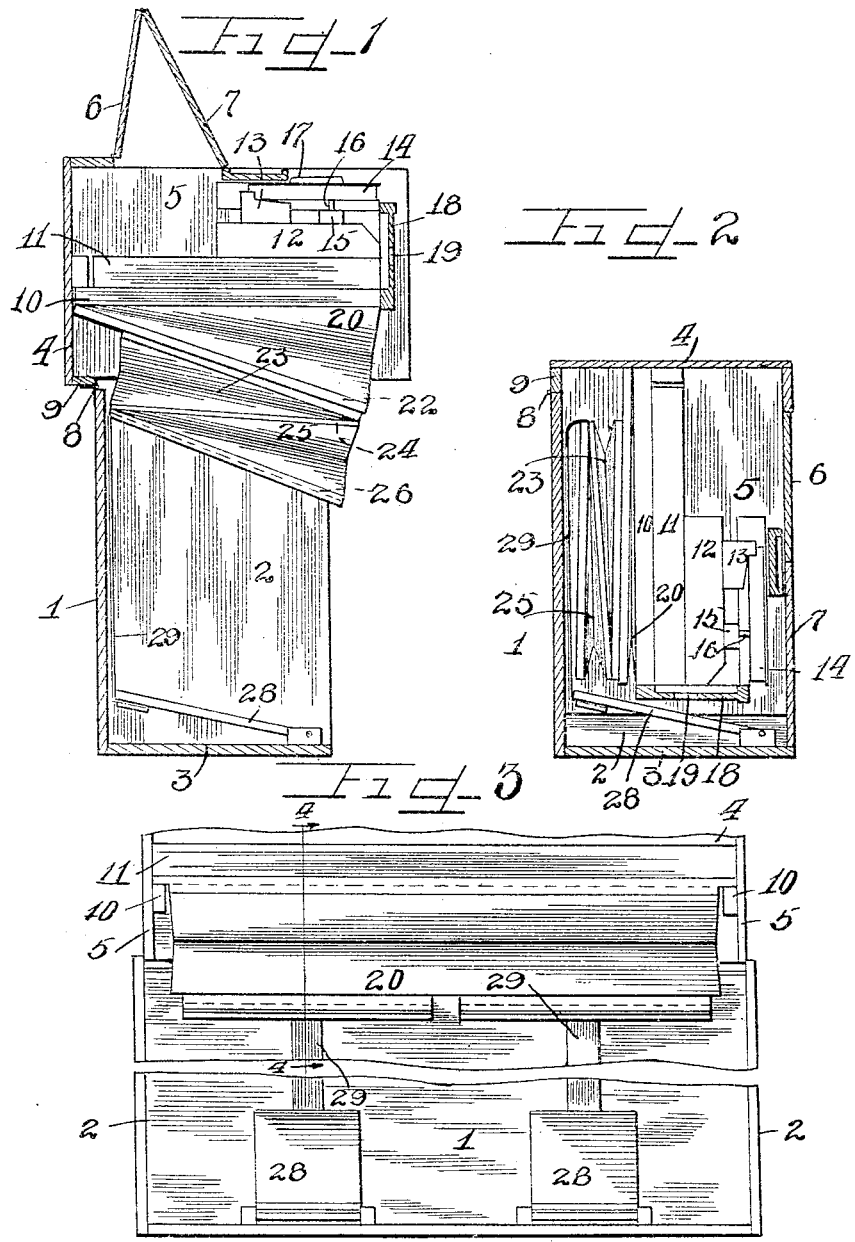

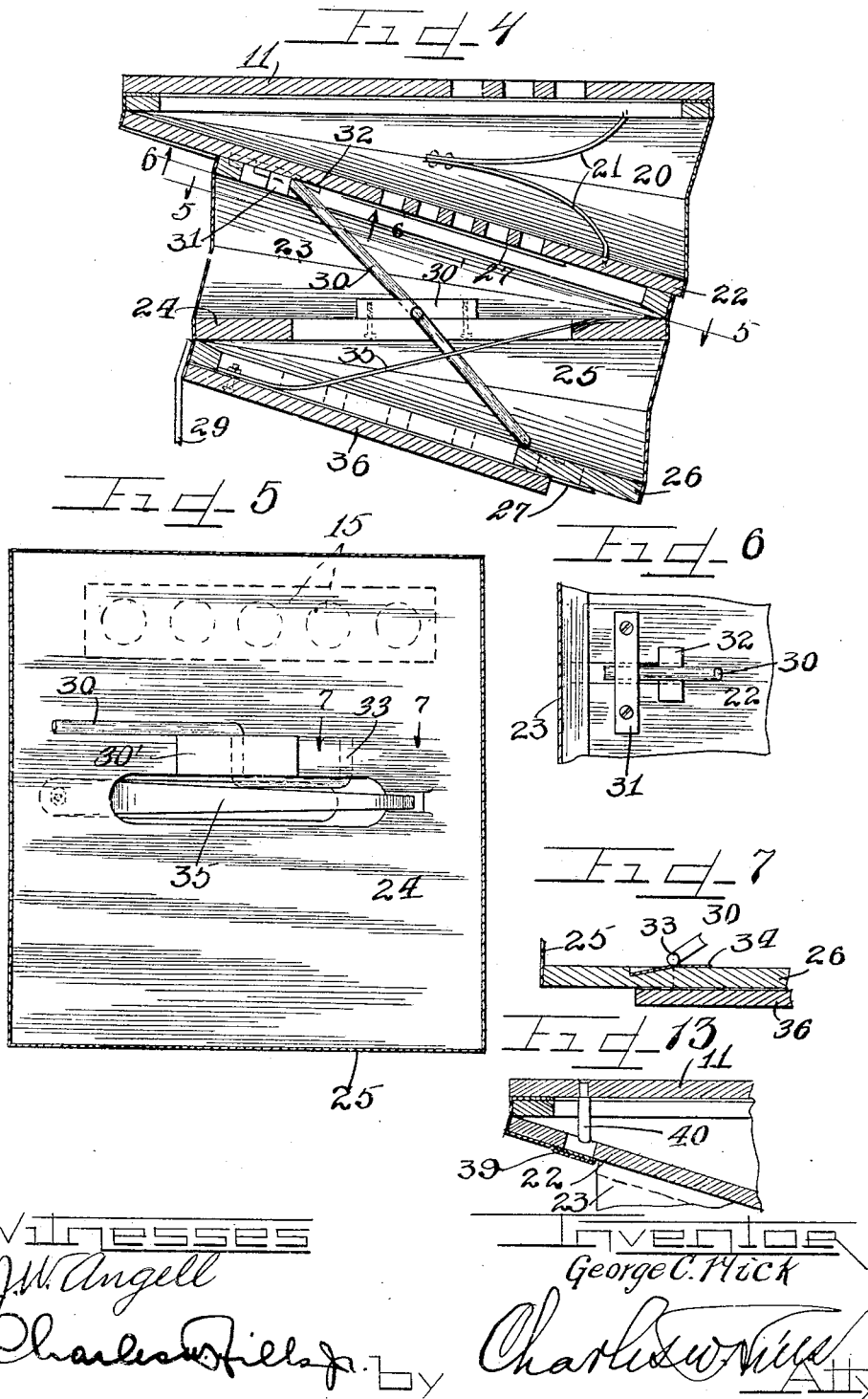

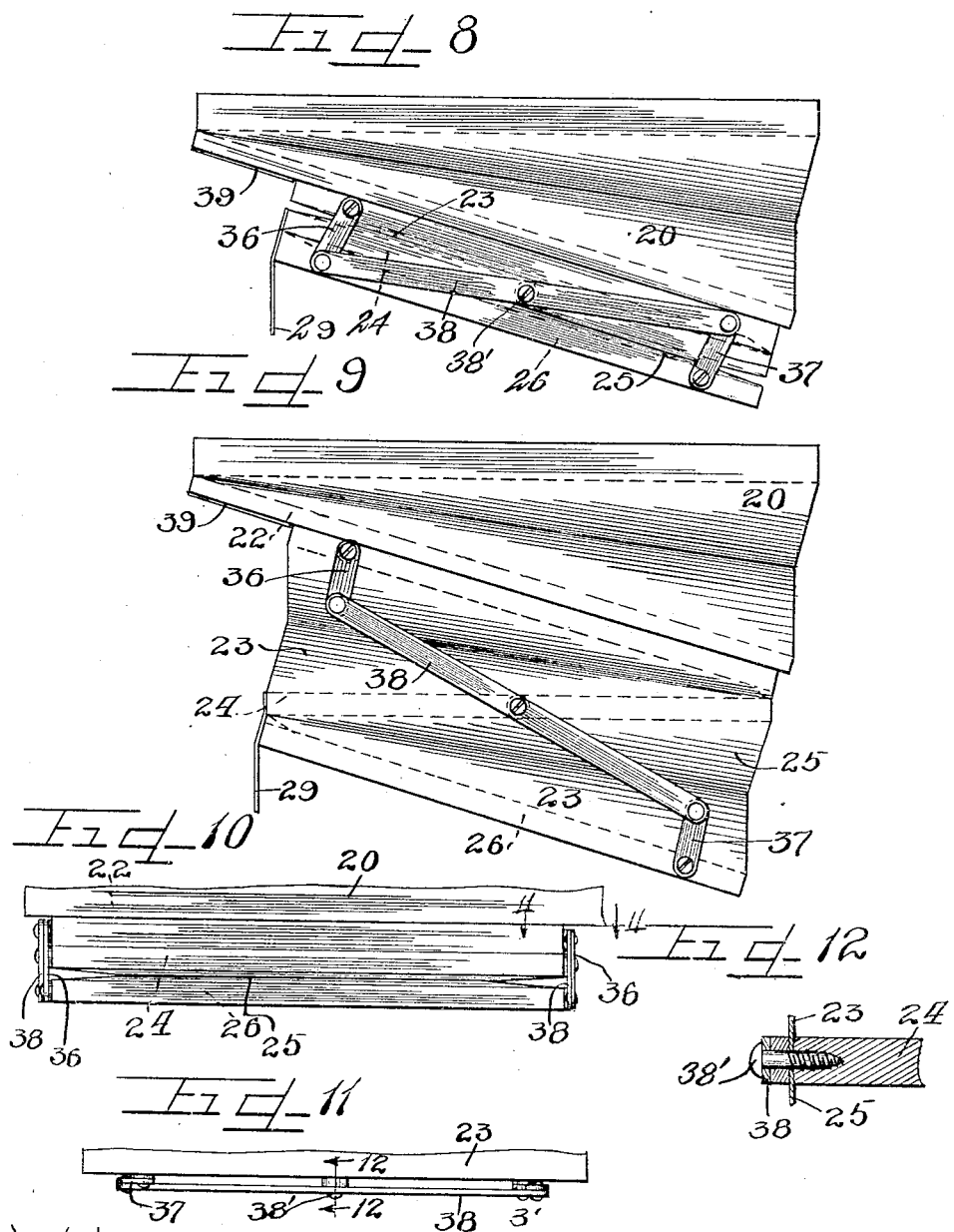

GEORGE C. WICK, OF CHICAGO, ILLINOIS, ASSIGNOR TO PETER P. BILHORN, OF CHICAGO, ILLINOIS.

ORGAN-BELLOWS.

1,204,103.   Specification of Letters Patent.   Patented Nov. 7, 1916.

Application filed January 30, 1915. Serial No. 5,224.

*To all whom it may concern:*

Be it known that I, GEORGE C. WICK, a citizen of the United States, and a resident of the city of Chicago, in the county of Cook and State of Illinois, have invented certain new and useful Improvements in Organ-Bellows; and I do hereby declare that the following is a full, clear, and exact description of the same, reference being had to the accompanying drawings, and to the numerals of reference marked thereon, which form a part of this specification.

This invention relates to an improved bellows construction adaptable for use particularly upon organs, though of course adapted for use upon any other devices to which bellows are applicable.

This invention is more particularly adaptable to that type of organs which are collapsible and foldable into a small space so as to be portable. Ordinarily the bellows require considerable space and in a collapsible organ the size of the bellows has been necessarily limited. It is obvious that this greatly interferes with the operation and tone of the instrument, for unless the bellows provided act to withdraw the air from the vacuum box of the organ at a sufficient rate a feeble tone will be the result.

It is an object therefore of this invention to construct an improved form of bellows for attachment on collapsible organs wherein the bellows capacity is practically doubled by constructing a double acting bellows requiring but very little more space for storage when the organ is collapsed than the types of single bellows heretofore used.

It is also an object of this invention to construct an improved double acting bellows construction wherein substantially two individual bellows are connected one to another for simultaneous operation.

It is also an object of this invention to construct an improved form of bellows well adapted for use on collapsible organs, said bellows provided with springs for normally impelling the same into closed position, and connected to another main bellows provided with springs normally maintaining the latter bellows open, the springs in the latter bellows acting when the organ is collapsed, to resist such adjustment of the parts, so that in extending the organ to open position, the springs assist in the movement thereof.

It is furthermore an important object of this invention to construct an improved type of double acting bellows normally impelled into a closed position by springs mounted therewithin, said bellows connected to a main bellows normally impelled into an open position by other springs, and both of said bellows connected upon an organ which is collapsible into its casing and portable from place to place, the double acting bellows moving into a confined space in closed position together with the main bellows when the organ is collapsed.

It is finally an object of this invention to construct an improved form of double acting bellows so interconnected that actuation of one of the bellows serves to simultaneously and similarly operate the other, and said bellows adapted to collapse into a small space when not in use, well adapting the same for use upon a collapsible portable organ.

The invention (in a preferred form) is illustrated in the drawings and hereinafter more fully described.

In the drawings: Figure 1 is a central vertical section taken through a collapsible organ equipped with bellows embodying the principles of my invention, showing the interior parts of the organ in elevation. Fig. 2 is a similar view thereof showing the organ collapsed, and inclosed within its casing. Fig. 3 is a fragmentary front view with parts removed of the lower bellows portion of the organ when the organ is erected in position for use. Fig. 4 is a fragmentary detail section taken on line 4—4 of Fig. 3. Fig. 5 is a detail section taken on line 5—5 of Fig. 4. Fig. 6 is a fragmentary detail view taken on line 6—6 of Fig. 4. Fig. 7 is a detail sectional view taken on line 7—7 of Fig. 5. Fig. 8 is a side elevation of a modified form and arrangement of bellows shown in collapsed position. Fig. 9 is a similar view thereof showing the same extended. Fig. 10 is an end view of the bellows shown in Fig. 8, in collapsed position. Fig. 11 is a fragmentary view taken on line 11—11 of Fig. 10. Fig. 12 is a fragmentary section taken on line 12—12 of Fig. 11. Fig. 13 is a detail section on line 13—13 of Fig. 3.

As shown in the drawings: the casing for the organ consists of two hingedly connected top and bottom sections, the bottom section comprising a rear wall 1, end walls 2, and a bottom 3. The top section consists of a top wall 4, end walls 5, and a hinged sectional front wall, the sections of which are denoted by the reference numerals 6 and 7, respectively. The top section is hingedly connected, as stated, to the bottom section by means of hinges 8, which are connected at the top of the wall 1, of the bottom section, and to a board 9, secured to the rear end of the top wall 4, of the top section.

Inasmuch as the particular playing mechanism forms no part of this invention, merely a general description thereof will suffice.

Secured on each of the end walls 5, of the top member, are horizontal blocks 10, upon which is rigidly secured a rectangular vacuum box 11, extending entirely across and lengthwise of the top member of the organ. Mounted above the vacuum box 11, at each end adjacent the end walls 5, are horizontal wooden strips or blocks 12, and secured upon said blocks and extending longitudinally within said top member from end to end thereof is a horizontal member 13, to which the keys 14 and 15, of the organ are pivotally connected. Another member 15, is secured at its ends upon said blocks 12, and extends parallel said member 13, and is provided with a plurality of pins 16, adapting the keys, which are apertured for the purpose, to engage downwardly thereover when the keys are depressed, thus guiding the same. A depression of any one of the key members actuates a certain valve which permits a flow of air across one of the organ reeds into the vacuum box 11, but inasmuch as the operation of such instruments is well known and forms no part of this invention the particular construction of the same is not entered into.

A front board 18, is provided, which extends between the end walls 5, and is secured to the end blocks 10, with a series of apertures 19, through said board which permit inflow of air to the reeds of the instrument.

The purpose and object of this invention is to equip an organ such as described with an improved bellows construction, whereby a greater evacuating effect upon the vacuum box 11, may be obtained than heretofore, and yet permitting the organ to fold up into the same space as heretofore, from the position shown in Fig. 1, to that shown in Fig. 2.

A main bellows 20, is in communication with the vacuum box 11, said bellows extending from one end of the organ casing to the other, and as shown in Figs. 1 and 4, is normally in an extended condition. This is due to the interposition of spring members 21, within said bellows as clearly shown in the sectional view in Fig. 4. An apertured light board member 22, forms the lower wall of the bellows 20, and also forms the upper bellows board of a pair of smaller vacuum bellows each denoted by the reference numeral 23. Each of said smaller bellows 23, is provided with a bellows board 24, having a relatively large opening therethrough, as clearly shown in Fig. 4, as well as a number of apertures, as clearly shown in Fig. 5, and said bellows board 24, is hingedly connected at one of its ends to the bellows board 22, through the intermediation of the bellows fabric. Another bellows 25, is connected to each of said bellows 23, and is similarly constructed, being provided with a bottom bellows board 26, which, at one of its ends, is hingedly connected to the end of the bellows board 24, the fabric affording the means of connection between said respective bellows boards. It is clear that a single piece of fabric constitutes the fabric for one pair of the bellows 23 and 25, the bellows board 24, being entirely inclosed within and concealed by the fabric. As in the case of the other bellows boards already described the latter bellows board 26, is provided with a plurality of apertures. In each of said bellows boards excepting the board 24, a strip of fabric or flapper valve member, which in each instance may be denoted by the reference numeral 27, is loosely fastened over the holes in the respective bellows boards, so that during an evacuating movement thereof the vacuum induced within the bellows will serve to draw the flapper fabric tightly over the apertures to seal the same, and a collapsing movement of said bellows results in the expulsion of the air through said apertures, of course the fabric falling away and permitting the passage of the air through the apertures. The respective auxiliary bellows 23 and 25, which serve to evacuate the main bellows 20, and thereby the vacuum box 11, are actuated by foot pedals 28, pivotally mounted on the bottom 3, of the lower casing section of the organ, and at their free ends connected by means of bellows straps 29, to the inner extremity or junction point of the respective bellows 23 and 25.

Thus depressing one of the pedals causes expansion of the bellows 23, and mechanism is provided within the bellows shown in Fig. 4, to effect a simultaneous expansion of the bellows 25, so that the two may coöperate in evacuating the bellows 20. For this purpose a long lever, which may preferably be a round rod 30, is pivotally mounted in a block 30' upon the inner bellows board 24, the rod being bent for the purpose, as clearly shown in Fig. 5, and with the upper end of the rod projecting into the bellows 23, having sliding engagement beneath a retaining member 31, secured upon the under surface of the bellows board 22, and with a strip of felt 32, secured upon the bellows board therebeneath, to prevent rattling and undue noise. The other or lower end of said rod 30, is bent at right angles to the rod, as indicated by the reference numeral 33, and bears upon the strip of felt 34, secured upon said bellows board 26. In order to move said respective bellows 23 and 25, normally into a collapsed position, a long leaf spring member 35, is attached at one of its ends upon a supplementary board 36, secured on the under surface of the bellows board 26, and at its other end to the bellows board 24, as clearly shown in Fig. 5. Of course the spring 35, acts directly to collapse the bellows 25, but inasmuch as said bellows is operatively connected to the bellows 23, by means of the rod 30, it necessarily follows that both of said bellows 23 and 25, operate simultaneously and move into a collapsed position.

In Figs. 8 to 12 inclusive I have illustrated a modified form of device wherein a slightly different operating mechanism is provided for insuring a simultaneous operation of the respective bellows 23 and 25. For this purpose on the exterior of said bellows on each side thereof a short link 36, is pivotally connected to one of the attaching strips for the fabric to the bellows board, the attaching strip, however, being concealed and only illustrated in dotted lines, and another similar link 37, is attached upon the lower edge of the bellows board 26. A long bar or lever 38, is pivoted at its middle by means of a screw 38' upon the intermediate bellows board 24, and at its ends said lever is pivoted to the free extremities of the respective links 36 and 37. It is readily apparent, therefore, that when the bellows strap 29, is pulled downwardly, thus expanding the upper bellows 23, such movement is transmitted through the respective links and lever 38, to the lower bellows 25, so that the two coöperate in evacuating the bellows 20. It is obvious that the long lever 38, could have a pin and slot sliding engagement at its ends with the respective bellows members instead of the link connection shown.

The operation is as follows: The respective pairs of auxiliary bellows 23 and 25, are normally maintained in a closed position by the springs 35, therewithin, and when expanded by depression of the pedals 28, act to exhaust the air from the main bellows 20, with which they are in communication. This of course, by a number of actuations of said auxiliary bellows, causes the main bellows 20, to collapse against the stress of the springs 21, provided therein, which normally maintain the same expanded. Of course the air within the vacuum box 11, is also evacuated by the action of the small bellows 23 and 25, so that when the keys of the organ are depressed in playing the organ there will be a sufficient evacuated space to take care of release of air thereinto by depression of the keys, to prevent the pulsations of actuation of the small auxiliary bellows 23 and 25, being evidenced in the note or tone produced by the reeds of the organ.

The operation in the two constructions illustrated in Figs. 4, 5, 6, and 7, and the constructions illustrated in Figs. 8, 9, 10, 11, and 12, are identical, that is, actuation of one of the supplementary bellows causes simultaneous actuation of the other to take place. In prior constructions the organs have been constructed only with the supplementary pairs of bellows 23, connected to the main bellows 20, for the reason that it was deemed inexpedient to connect more or even larger bellows into the device inasmuch as compactness is essential in this type of device. However, by the inclusion of the extra bellows 25, operated by suitable mechanisms from the bellows 23, no re-arrangement of the parts is necessary, and yet a greatly increased efficiency in the operation of the bellows as evacuating means is attained.

As clearly shown in Fig. 13, a flap valve 39, is mounted on the exterior of the bellows board 22, over an aperture therein, and is closed when said bellows board is swung downwardly. However, when the bellows board 22, swings upwardly, a fixed pin 40, mounted on the under surface of the vacuum box 11, projects through the aperture and opens the valve 39, so that after playing the organ and after the bellows are closed the valve acts to break the vacuum in the vacuum box.

When the device is opened for use, as shown in Fig. 1, the hinged side boards 6 and 7, of the top casing section may be arranged at an angle with one another to afford a music rack, and when the device is closed the joint therebetween is broken and the boards are swung downwardly to lie flat along the edge of the end members 5. The upper section is then turned about the hinges 8, downwardly into the position shown in Fig. 2, thus collapsing all of the bellows one against the other against the rear wall 1, of the lower casing section. The entire device in the folded position shown in Fig. 2, is entirely closed, and is easily portable.

I am aware that various details of construction may be varied through a wide range without departing from the principles of this invention, and I therefore do not purpose limiting the patent granted otherwise than necessitated by the prior art.

I claim as my invention:

1. In a bellows construction of the class described, the combination with a vacuum box of an organ, of a main vacuum bellows connected therewith, an auxiliary vacuum bellows connected to said main bellows and comprising two chambers collapsible from opposite ends, a pedal for operating one of said chambers, and connections between said chambers whereby said operation is imparted to the other chamber.

2. In a bellows construction of the class described, the combination with the vacuum box of an organ, of a main vacuum bellows connected therewith, an auxiliary vacuum bellows connected to said main bellows and comprising two chambers collapsible from opposite ends, a pedal for operating one of said chambers, a rod hinged intermediate said chambers and adapted upon the operation of one of said chambers to communicate said operation to the other chamber, and a single spring acting normally to retain both of said chambers expanded.

In testimony whereof I have hereunto subscribed my name in the presence of two subscribing witnesses.

GEORGE C. WICK.

Witnesses:
PETER R. BILHORN,
CHARLES W. HILLS, Jr.

Copies of this patent may be obtained for five cents each, by addressing the "Commissioner of Patents, Washington, D. C."